United States Patent [19]

Slagle

[11] 3,734,826

[45] May 22, 1973

[54] METHOD OF SUPPRESSING THE FORMATION OF METHYL IODIDE IN A WATER-COOLED NUCLEAR REACTOR

[75] Inventor: William L. Slagle, Idaho Falls, Idaho

[73] Assignee: The United States of America as represented by the United States Atomic Energy Commission, Washington, D.C.

[22] Filed: July 20, 1972

[21] Appl. No.: 273,668

[52] U.S. Cl. ...................176/37, 176/38, 176/92 R
[51] Int. Cl. ................................................G21c 9/00
[58] Field of Search.....................176/37, 38, 92 R; 423/241

[56] References Cited

UNITED STATES PATENTS 3,630,942  12/1971  Soldano et al..........................176/37
3,338,665  8/1967  Silverman................................176/37

Primary Examiner—Harvey E. Behrend
Attorney—Roland A. Anderson

[57] ABSTRACT

Release of methyl iodide to the environment following a major loss-of-coolant accident in which significant core meltdown occurs is prevented by suppressing its formation rather than by reducing its concentration after it has been formed. This is accomplished by injecting a large excess of a material which is more reactive to methyl radicals than is iodine, such as chlorine or fluorine, into the reactor plenum and, if desired, into the reactor containment vessel immediately upon occurrence of a major loss-of-coolant accident. Preferably, the chlorine injection system is activated the same time as the emergency core cooling system.

6 Claims, No Drawings

METHOD OF SUPPRESSING THE FORMATION OF METHYL IODIDE IN A WATER-COOLED NUCLEAR REACTOR

CONTRACTUAL ORIGIN OF THE INVENTION

The invention described herein was made in the course of, or under, a contract with the UNITED STATES ATOMIC ENERGY COMMISSION.

BACKGROUND OF THE INVENTION

This invention relates to a method of increasing the safety of a nuclear reactor. In more detail, the invention relates to a method of suppressing the formation of methyl iodide in a water-cooled nuclear reactor following a major loss-of-coolant accident in which significant core meltdown occurs.

Reactor designers must assume that a major loss-of-coolant accident in which significant core meltdown occurs is a credible accident. Any such accident will release radioactive fission products to the containment vessel surrounding the reactor. One of the most troublesome fission products is iodine–131 because of its biological effects and long half-life and organic iodide is particularly troublesome because of the difficulty in removing it from a containment environment.

Methyl iodide, which comprises the major fraction of organic iodide in a loss-of-coolant containment environment, is formed when fission product iodine is released from failed fuel and combines with methyl radicals ($CH_3^+$), the exact origin of which is still unresolved. However, they are widely believed to originate in traces of organic fluxes residual from the fuel manufacturing process. The AEC Division of Reactor Licensing requires applicants for reactor licenses to assume that as much as 10 percent of the radioiodine released to containment during core meltdown is eventually converted to organic iodide and that there will be a containment leakage rate of 0.1 percent/day. Thus, the largest single factor influencing the siting of large reactors at this time is the assumed presence of organic iodide in the containment vessel following a major loss-of-coolant accident.

Various methods have been suggested for removing iodine and organic iodide from the reactor containment vessel following a loss-of-coolant accident. These include the use of spray solutions, foams, coatings and filters. These all reduce the concentrations of methyl iodide after it has been formed. While known procedures will remove elemental iodine in an acceptable manner, no procedures are now known which will also remove organic iodide in a completely acceptable manner.

SUMMARY OF THE INVENTION

In view of the difficulty in removing methyl iodide from a reactor containment vessel, according to the present invention the formation of methyl iodide in the reactor core of a water-cooled reactor is suppressed by injecting into the reactor plenum and, if desired, into the reactor containment vessel, a large excess of a stable material which is more reactive to methyl radicals than is iodine immediately upon occurrence of a loss-of-coolant accident in which significant core meltdown occurs. Either chlorine or fluorine gas can be used and the injection will preferably take place upon activation of an emergency core-cooling system.

SPECIFIC EMBODIMENT OF THE INVENTION

According to a preferred embodiment of the invention, a cylinder of chlorine containing 50 to 100 pounds of chlorine under high pressure is connected to the plenum of a water-cooled reactor by a valve system that will positively exclude the chlorine from the reactor during ordinary operation of the reactor but will release the chlorine to the reactor plenum at a height corresponding to the upper ⅓ of the reactor core upon occurrence of a loss-of-coolant accident and activation of the emergency core-cooling system of the reactor. The desired concentration of chlorine atoms thus attained in the upper portion of the reactor plenum is at least on the order of $10^{-2}$ g-moles per liter of volume, this representing a ratio of about 10,000 atoms of chlorine in the plenum to one atom of fission-product iodine. This concentration of chlorine is not critical since the purpose of the present invention is best attained by providing as high a concentration of chlorine in the plenum as is physically possible to attain. The concentration given thus merely represents an attainable and acceptable figure. Since chlorine is much more reactive than iodine and present in overwhelming proportions compared to the radioactive iodine, most of the methyl radicals will react with the chlorine, thus cutting drastically into the formation of methyl iodide.

It will be appreciated that any stable material which is more reactive to methyl radicals than is iodine can be used to attain the advantages of the present invention. While chlorine is preferred, fluorine, for example, also could be used.

It is anticipated that injection of chlorine into the reactor plenum will essentially eliminate methyl iodide as a factor to be considered from the reactor system. It is believed that the largest fraction of methyl iodide conversion occurs in the short period of time directly following clad failure while the iodine and methyl radicals are in the reactor plenum. Temperature, humidity and radiation field conditions are near optimum for radical formation in the upper plenum during a reactor accident. Since both iodine and methyl radicals are present, much of the methyl iodide must be formed in the reactor plenum. It has, however, been suggested that significant methyl iodide formation also occurs in the containment vessel as methyl radicals are released from containment coatings and other organic sources within the containment. Methyl iodide formation is suppressed here also, as much of the chlorine or fluorine introduced into the reactor plenum is swept into the containment environment. Since such a large excess of chlorine or fluorine is introduced into the plenum, sufficient chlorine or fluorine atoms should also pass to the containment vessel to prevent the formation of methyl iodide therein. Of course, an additional line or lines can be provided to supply chlorine or fluorine directly to the containment vessel if further analysis or experiments show this to be necessary or desirable.

It is, of course, recognized that the presence of chlorine or fluorine in a water-cooled reactor system would be very undesirable if there were any thought of using the reactor after the accident. However, the proposed method is expected to come into play only after a catastrophic accident has occurred, after which safety will be the only consideration since reuse of the reactor is not likely.

The embodiments of the invention in which an exclusive property or privilege is claimed are defined as follows:

1. A method of suppressing the formation of methyl iodide in a water-cooled nuclear reactor following a loss-of-coolant accident comprising injecting into the reactor a large excess of a stable material which is more reactive with respect to methyl radicals than is iodine immediately upon occurrence of a major loss-of-coolant accident.

2. A method according to claim 1 wherein the material which is more reactive with respect to methyl radicals than is iodide is injected into the reactor plenum.

3. A method according to claim 2 wherein the material which is more reactive with respect to methyl radicals than is iodine is chlorine.

4. A method according to claim 2 wherein the material which is more reactive with respect to methyl radicals than is iodine is fluorine.

5. A method according to claim 3 wherein sufficient chlorine is employed to obtain a concentration of chlorine in the upper plenum of at least on the order to $10^{-2}$ g-moles per liter.

6. A method according to claim 5 wherein chlorine is also injected in the containment vessel upon occurrence of the major loss-of-coolant accident in which significant core meltdown occurs.

* * * * *